(12) United States Patent
Fisher (10) Patent No.: US 11,650,038 B1
(45) Date of Patent: May 16, 2023

(54) MEASUREMENT DEVICE

(71) Applicant: Christopher R. Fisher, Coxsackie, NY (US)

(72) Inventor: Christopher R. Fisher, Coxsackie, NY (US)

(*) Notice: Subject to any disclaimer, the term of this patent is extended or adjusted under 35 U.S.C. 154(b) by 0 days.

(21) Appl. No.: 18/090,365

(22) Filed: Dec. 28, 2022

(51) Int. Cl.
*G01B 3/10* (2020.01)
*G01B 3/12* (2006.01)
*B23D 59/00* (2006.01)
*G01B 3/02* (2020.01)

(52) U.S. Cl.
CPC .......... *G01B 3/12* (2013.01); *B23D 59/001* (2013.01); *G01B 3/02* (2013.01)

(58) Field of Classification Search
CPC .............. B23D 59/001; B23D 59/002; B23Q 17/2233
USPC ................................. 33/630, 640
See application file for complete search history.

(56) References Cited

U.S. PATENT DOCUMENTS

| 2,747,625 | A | | 5/1956 | Small |
| 3,688,410 | A | | 9/1972 | Zeidler et al. |
| 4,984,371 | A | * | 1/1991 | Fredrickson ........... B23Q 17/24 33/630 |
| 5,197,365 | A | | 3/1993 | Clifton |
| 5,787,599 | A | | 8/1998 | Clifton |
| 5,901,457 | A | * | 5/1999 | Harding .................. G01B 3/02 33/630 |
| 6,157,369 | A | | 12/2000 | Merminod et al. |
| 7,165,338 | B2 | * | 1/2007 | Clifton .................... B27B 27/04 33/630 |
| 7,673,547 | B2 | * | 3/2010 | Terashima ........... B23D 59/002 83/490 |
| 7,882,772 | B2 | | 2/2011 | Wise |
| 8,739,426 | B1 | | 6/2014 | Freed et al. |
| 9,505,071 | B2 | | 11/2016 | Knight et al. |
| 9,925,684 | B2 | * | 3/2018 | Sinzig ...................... G01B 5/02 |
| 10,005,199 | B2 | * | 6/2018 | Sinzig .................. B23D 59/002 |
| 10,099,303 | B2 | * | 10/2018 | Yoshida .................. B25F 5/001 |
| 10,611,047 | B2 | * | 4/2020 | Kuehn ...................... B27B 9/02 |
| 10,906,110 | B2 | * | 2/2021 | Mayer .................. B23D 59/001 |
| 11,420,274 | B2 | * | 8/2022 | Frank ........................ B25F 5/00 |
| 2006/0137202 | A1 | | 6/2006 | Clifton |

(Continued)

OTHER PUBLICATIONS

Reekon M1 Caliber Measuring Tool, downloaded from reekon.tools on Aug. 25, 2022, 2 pages.

(Continued)

*Primary Examiner* — George B Bennett
(74) *Attorney, Agent, or Firm* — LaBatt, LLC (57) ABSTRACT

A measurement device and/or system for measuring a material length, such as for a human-operated cutting device, includes an elongate band located in a band housing. The elongate band can be extended from the band housing under tension in response to a catch attached to an end of the elongate band grabbing onto an end of a material that is extended beyond an opening at which the catch is located. A computing unit can calculate a length of the material using length data acquired by one or more length acquisition devices, and a measurement interface can provide a user with information corresponding to the calculated length in order to assist the user with accurately cutting the material at a desired location.

20 Claims, 8 Drawing Sheets

(56) References Cited

U.S. PATENT DOCUMENTS

| | | | |
|---|---|---|---|
| 2015/0059186 A1* | 3/2015 | Bermes | B27B 9/02 |
| | | | 702/158 |
| 2019/0339051 A1 | 11/2019 | Echols | |
| 2021/0331345 A1 | 10/2021 | Reed et al. | |
| 2022/0176580 A1* | 6/2022 | Ottemeier | B27B 27/02 |
| 2022/0203465 A1* | 6/2022 | Vehling | B23D 47/04 |

OTHER PUBLICATIONS

Reekon M1 Caliber Electronic Measuring Device Quick Start Guide, downloaded from reekon.tools on Aug. 25, 2022, 2 pages.
Ontel Measure King 3-in-1 Digital Tape Measure String Mode, Sonic Mode & Roller Mode as seen on Tv, Product listing at amazon.com, printed on Dec. 6, 2022, 11 pages.

\* cited by examiner

MEASUREMENT DEVICE

TECHNICAL FIELD

The disclosure relates generally to measuring a length of material, and more particularly, to measuring a length of material to be cut, e.g., using a cutting device such as a miter saw.

BACKGROUND ART

Human operated cutting instruments, such as miter saws, often do not have ready mechanisms for measuring a length of a material to be cut. Such measurements often must be manually done by the individual operating the saw prior to cutting the material. Some cutting instruments, such as table saws, include measurement mechanisms for readily measuring smaller lengths of material, but longer lengths of material need to be measured manually.

Manual measurements have several opportunities for errors to be introduced or mistakes to be made. For example, the operator may inadvertently shift a location of the material when changing between completing the measurement and cutting the material. Additionally, a user may inadvertently misread a tape measure. Similarly, a user may not be familiar with the units in which a measurement is requested. For example, users that learned only metric measurements may find it difficult to determine measurements in English units and vice versa.

A previous approach has sought to provide a solution for automating the measurement process. In this approach, a measurement device can be attached to a vertical backstop of a miter saw. The measurement device includes a wheel which increments a measurement counter as a board is moved under the wheel, which can provide a measurement.

SUMMARY OF THE INVENTION

The inventor has recognized a need for an improved solution for measuring materials, including materials to be cut by an individual. In particular, the inventor has found the prior art approaches are too limiting and/or too cumbersome to be readily utilized. Placement of the measuring device on the backstop can intrude on proper placement of some materials, necessitating removal of the measuring device. Each removal and reinstallation of the device requires the user to recalibrate the distance measurements acquired using the device. Additionally, the measurement approach implemented often provides inaccurate measurements.

Aspects of the invention provide a measurement device and/or system, such as for a human-operated cutting device, which includes an elongate band located in a band housing. The elongate band can be extended from the band housing under tension in response to a catch attached to an end of the elongate band grabbing onto an end of a material that is extended beyond an opening at which the catch is located. A computing unit can calculate a length of the material using length data acquired by one or more length acquisition devices, and a measurement interface can provide a user with information corresponding to the calculated length, e.g., in order to assist the user with accurately cutting the material at a desired location.

A first aspect of the invention provides a human-operated cutting device comprising: a platform for supporting a material to be cut; a cutting instrument for cutting the material at a cutting location along the platform; a band housing for containing an elongate band under tension, the band housing including an opening through which the elongate band can be extended and retracted; a catch attached to an end of the elongate band, wherein the catch is configured to grab onto an end of the material as it is extended beyond a side of the platform; at least one length acquisition device for acquiring length data corresponding to a length of the elongate band that has been extended from a minimum extension; a computing unit for calculating a length of the material to be cut using the length data; and a measurement interface for providing a user with information corresponding to the calculated length of the material.

A second aspect of the invention provides a device comprising: a platform for supporting a material; a backstop for locating the material on the platform, wherein the platform and the backstop define a cutting location for the material; and a band housing mounted to at least one of: the platform or the backstop, wherein the band housing includes: an elongate band spooled under tension; and an opening through which the elongate band can extend and retract; a catch attached to an end of the elongate band, wherein the catch is configured to grab onto an end of the material as it is extended beyond a side of the at least one of: the platform or the backstop; at least one length acquisition device for acquiring length data corresponding to a length of the elongate band that has been extended from a minimum extension; a computing unit for calculating a length of the material to be cut using the length data; and a measurement interface for providing a user with information corresponding to the calculated length of the material.

A third aspect of the invention provides a measurement device comprising: a structure configured for mounting to at least one of: a platform or a backstop, of a cutting device, wherein the structure includes a housing including an elongate band spooled under tension and an opening through which the elongate band can be extended; a catch attached to an end of the elongate band, wherein the catch is configured to grab onto an end of material as it is extended beyond a side of at least one of: the platform, the backstop, or the structure; at least one length acquisition device for acquiring length data corresponding to a length of the elongate band that has been extended from a minimum extension; a computing unit for calculating a length of the material using the length data; and a measurement interface for providing a user with information corresponding to the calculated length of the material.

The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide a measurement device and/or system, such as for a human-operated cutting device, which includes an elongate band located in a band housing. The elongate band can be extended from the band housing under tension in response to a catch attached to an end of the elongate band grabbing onto an end of a material that is extended beyond an opening at which the catch is located. A computing unit can calculate a length of the material using length data acquired by one or more length acquisition devices, and a measurement interface can provide a user with information corresponding to the calculated length, e.g., in order to assist the user with accurately cutting the material at a desired location.

Turning to the drawings, FIGS. 1A-1D show various views of an illustrative cutting device 10 according to an embodiment. In this case, the cutting device 10 is a miter saw. While FIGS. 1A-1C only illustrate a right side of a miter saw described herein, it is understood that aspects of the invention can be equally applied to a left side of a cutting device 10. To this extent, embodiments can enable measurement on a right or left side or both sides of a cutting location of the cutting device 10.

It is understood that a miter saw is only illustrative of various human-operated cutting devices 10 according to embodiments of the invention. For example, other types of cutting devices 10 include a table saw, an abrasive saw, a chop saw, and/or the like. Embodiments of the invention can be implemented on a cutting device 10 that cuts material using any cutting approach, including a rotating cutting instrument, a reciprocating cutting instrument, etc. While a typical cutting device 10 can be electrically powered, it is understood that embodiments of the invention can be equally applied to hand-operated cutting devices, and cutting devices operated using any source of power.

Regardless, as illustrated by the cutting device 10 of FIGS. 1A-1D, a cutting device 10 can include a cutting instrument 12, which can be operated by a user using an operator handle 14. When electrically powered, the cutting instrument 12 can be powered by a motor mounted in a motor housing 16. A cutting device 10 also can include a fixed platform 20 on which a material 2 to be cut is placed and a backstop 22 against which the material 2 can be placed, thereby allowing the cutting instrument 12 to cut the material 2 at a precise angle.

For some cutting devices, the cutting instrument 12 can be rotated in one or more degrees of freedom in order to cut the material 2 at an angle greater than or less than ninety degrees. To this extent, the cutting instrument 12 is shown including a rotatable platform 24 which can rotate with the cutting instrument 12 relative to the backstop 22 and the fixed platform 20 to cut the material 2 at a desired angle. The fixed platform 20 can include an end support structure 26, such as a side wall, one or more legs, etc., which, together with a similar support structure on an opposing side of the cutting instrument 12 and rotatable platform 24, supports the cutting instrument 12 and the rotatable platform 24 above a surface, thereby enabling the rotatable platform 24 and cutting instrument 12 to be readily rotated.

In general, a cutting device 10, regardless of the rotation of the rotatable platform 24, has a substantially constant platform distance D extending between a cutting location 28A, defined by a side surface of the cutting instrument 12 and located adjacent to an inner end of the backstop 22, and an end of the platform 28B at a location adjacent to the backstop 22.

In an embodiment, the cutting device 10 includes an integrated measurement system 30 for accurately measuring a length of the material 2 to be cut. In an embodiment, for measuring material lengths less than the distance D, the integrated measurement system 30 can include measurement markings 31 located on the backstop 22 and/or the platform 20 for measuring various distances along the distance D. In an embodiment, the measurement markings 31 are configured to provide an accurate measurement when the cutting instrument 12 is oriented at a ninety degree angle to the backstop 22.

Furthermore, the integrated measurement system 30 can be configured to provide accurate measurements for material lengths larger than the distance D. To this extent, as illustrated in FIG. 1D, the measurement system 30 can include a band housing 32 mounted to an underside of the fixed platform 20 using any solution. For example, the band housing 32 can be mounted using one or more fasteners (e.g., screws), magnet(s), tie(s), solder, an adhesive, strips of hook and loop fasteners, and/or the like. The band housing 32 can house an elongate band 34, which can be selectively extended from the band housing 32 through an opening 32A. The elongate band 34 can be fabricated using any suitable material. In general, the material should be capable of being unwound and extended under tension without stretching. For example, the elongate band 34 can comprise a metal strip, a cord, string, line, etc., which is fabricated from a material (e.g., nylon, a polymer, etc.) and/or in a manner that prevents any significant stretching, and/or the like.

An end of the elongate band 34 can be configured to catch an end of the material 2 as it is extended beyond the fixed platform 20. To this extent, an end of the elongate band 34 can extend through an opening in the end support structure 26 at a predetermined location. In an embodiment, the opening can be located approximately a half inch to three inches (one to eight centimeters) from the backstop 22. In a more particular embodiment, the opening is located between a half inch and one and a half inches (one to four centimeters) from the backstop 22. Additionally, the opening can be located just below the surface of the fixed platform 20, e.g., within one and a half inches (four centimeters) from the surface of the fixed platform. However, it is understood that this location is only illustrative and other suitable locations can be used, which can vary based on a size and/or shape of the material 2 to be cut.

In an embodiment, an opening can include a plurality of selectable locations at which the elongate band 34 can be located. For example, an opening can include a lateral slot with two or more vertical slots extending upward, which are located at different distances from the backstop 22. The user can selectively locate the elongate band 34 a desired distance from the backstop 22 by moving the elongate band 34 into a corresponding vertical slot.

In an embodiment, the opening can be formed in a solid end support structure 26, which can be fabricated from a metal, such as steel. To this extent, the measurement system 30 can include an opening structure 38A, 38B through which the elongate band 34 is routed. The opening structure 38A, 38B can define an opening shape and edges that enable suitable location of the elongate band 34 and will not cause significant wear or abrasion to the elongate band 34 during normal use. In an embodiment, the opening structure 38A, 38B can enable the selective relocation of the elongate band 34 at any one of a plurality of locations, e.g., by defining a plurality of slots as described herein. In a further embodiment, at least one of the selectable locations is a location at which the catches 36A, 36B do not extend above the platform 20. The opening structure 38A, 38B can be attached to the support structure 36 using any solution. For example, the opening structure 38A, 38B can include two parts with complementary shapes that snap together, are attracted magnetically, are secured using one or more fasteners, are glued together, and/or the like, on opposing sides of the opening. The elongate band 34 can be routed through the opening structure 38A, 38B, which can include rounded and/or smooth edges to avoid any significant wear and damage to the elongate band 34 during use.

The elongate band 34 is shown having catches 36A, 36B attached to an end thereof. The catches 36A, 36B can be configured to project above a surface of the fixed platform 20 at a location relatively close to the end of the platform 28B and the backstop 22. During use, when an end of the material 2 is extended beyond the end of the platform 28B, the catches 36A, 36B can grab onto the end of the material 2, thereby causing the elongate band 34 to extend further from the housing 30 as the material 2 is extended beyond the platform 20.

The catches 36A, 36B can be secured to the elongate band 34 using any solution. For example, a housing or a lateral member including the catches 36A, 36B extending vertically therefrom can be secured to the elongate band 34 by rivets, an adhesive, a knotted end of the elongate band 34 located within the housing, etc.

In an embodiment, the catches 36A, 36B are configured to be selectively located below the surface of the platform 20, e.g., when not in use. For example, the opening structure 38A, 38B can define an elongate opening, which can allow the elongate band 34 to be selectively held at a lower location at which the catches 36A, 36B do not extend above the surface of the platform 30. In particular, the elongate opening can have two lateral slots connected by a vertical slot, where a lower lateral slot holds the catches 36A, 36B below the platform 20, while an upper lateral slot (or a vertical slot extending therefrom) holds the catches 36A, 36B above the platform. Similarly, the support structure 26 can include a structure mounted thereto, which can secure the catches 36A, 36B in a location below the platform 30. In another embodiment, the catches 36A 36B can be rotatable such that they selectively extend or do not extend above the surface of the platform 30. Still further, the catches 36A, 36B can be rotated and secured to a bottom of the opening structure 38B when not in use.

While two catches 36A, 36B each having an elongate shape are shown, it is understood that these are only illustrative of any number of various types of instruments that can be used to grab onto the end of the material 2. A suitable instrument and number of instruments can be selected based on a size, shape, type, etc., of material 2 for which the cutting device 10 is intended to cut.

As described herein, similar to a tape measure, when extended, the elongate band 34 can be under tension to return to the band housing 32. As a result, once the catches 36A, 36B are released from the end of the material 2, the elongate band 34 can return to the band housing 32. Such tension can assist the catches 36A, 36B in maintaining a grip on an end of the material 2, acquiring an accurate measurement of the length of the material 2, and accounting for movement of the material 2 both away from as well as towards the platform 30.

Figure 2:
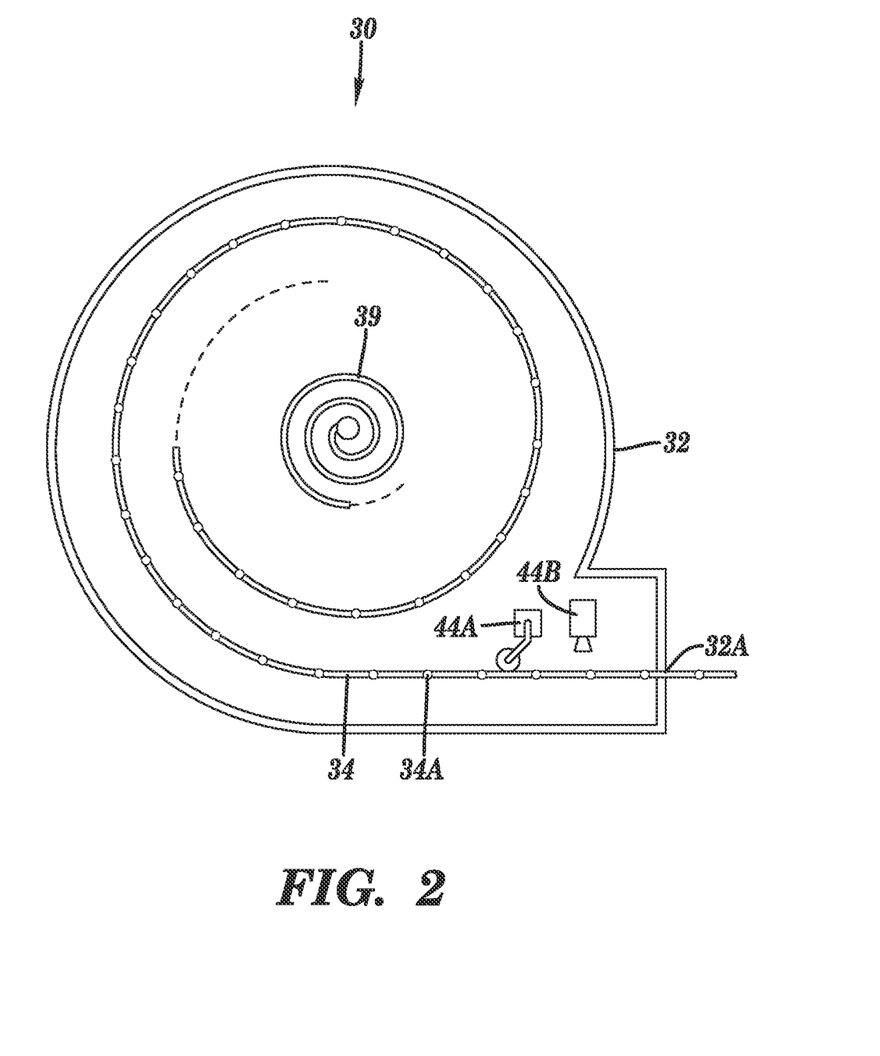
FIG. 2 shows an interior view of an illustrative measurement housing according to an embodiment.

FIG. 2 shows an interior view of an illustrative measurement housing according to an embodiment. As illustrated, the elongate band 34 can be wound within the band housing 32 prior to being extended through the opening 32A. In an embodiment, an internal end of the elongate band 34 is secured to a tensioning device, such as an end of a spring 39 using any solution, such as rivets, adhesive, soldering, fasteners, etc. An opposing end of the spring 39 can be mounted at a fixed location in the band housing 32 using any solution. As the elongate band 34 is pulled out of the band housing 32, the spring 39 will be wound tighter, thereby increasing in tension. When a force acting on the elongate band 34 is no longer sufficient to overcome the tension in the spring 39, the spring 39 will unwind and in the process return the elongate band 34 to the housing until the catches 36A, 36B are returned to the end of the platform 28B. While use of a spring 39 is shown, it is understood that the invention is not limited to this solution and other mechanisms for maintaining tension on the elongate band 34 and returning the band 34 to the band housing 32 can be utilized.

As the catches 36A, 36B on the end of the elongate band 34 are extended from and returned to the end of the platform 28B, the measurement system 30 can include one or more mechanisms for accurately indicating a length of the elongate band 34 that is extended from the end of the platform 28B. To this extent, the measurement system 30 is shown including a set of length acquisition devices 44A, 44B. Each length acquisition device 44A, 44B can acquire a measurement of the length of the elongate band 34 extending from the end of the platform 28B using any solution.

For example, a length acquisition device 44A can include a wheel, which rotates due to movement of the elongate band 34. The length acquisition device 44A can include a counter that increments or decrements a count depending on a direction of the movement. Each increment or decrement can correspond to a predetermined movement distance, which can correspond to all or a portion of a circumference of the wheel and can be selected based on a units of measurement and a desired accuracy. For example, an increment can correspond to a millimeter or a sixteenth of an inch. However, it is understood that larger or smaller distances can be utilized.

The length acquisition device 44B can use video data to determine a length of the elongate band 34 that is extending from the end of the platform 28B. In an embodiment, the length acquisition device 44B includes an integrated light emitter or is configured to be operated in conjunction with a light emitter. Regardless, the elongate band 34 can include measurement markings 34A, which are spaced at predetermined intervals along the length of the elongate band 34. The length acquisition device 44B can increment or decrement a count of the number of measurement markings 34A that have moved past the length acquisition device 44B based on direction of the movement of the elongate band 34. The spacing between the measurement markings 34A can be selected to provide any desired accuracy. For example, the spacing can correspond to a millimeter or a sixteenth of an inch. However, it is understood that larger or smaller distances can be utilized.

In an embodiment, data acquired by two or more length acquisition devices 44A, 44B can be used to determine an accurate measurement of the length of the elongate band 34 that is extending from the end of the platform 28B. The measurement data acquired by the length acquisition devices 44A, 44B can be combined using any solution. For example, the measurement data can be confirmed as providing the same measurement. When the measurements differ, an error can be generated, a measurement generally more accurate can be utilized, sufficiently close measurements can be averaged, and/or the like.

Data acquired by one of the length acquisition devices 44A, 44B can be used to refine the data acquired by another length acquisition device 44A, 44B to determine an accurate measurement of the length. For example, a first measurement device can be configured to provide an accurate measurement at a first, larger scale, while a second measurement device can be configured to provide an accurate measurement at a second, smaller scale. In this case, the measurement data acquired by the second measurement device can be synchronized to the measurement data acquired by the first measurement device to provide a refined, highly accurate measurement of the length of the elongate band 34.

In an embodiment, the elongate band 34 can have relatively widely spaced measurement markings 34A, e.g., approximately one inch or one centimeter, which are used to enable the length acquisition device 44B to acquire measurement data at a first, larger scale, while the length acquisition device 44A is configured to acquire measurement data at a second, smaller scale. In this case, each time a measurement marking 34A passes the length acquisition device 44B, a corresponding measurement acquired by the length acquisition device 44A can be synchronized with the larger scale measurement. For example, the length acquisition device 44A measurement data can be reset and/or synchronized to correspond with the measurement data provided by the length acquisition device 44B. In this manner, the length acquisition device 44A can provide measurement data for small scale measurements (e.g., sixteenth of an inch or a millimeter level), which is synchronized with the larger scale measurement data acquired by the length acquisition device 44B (e.g., an inch or a centimeter level).

It is understood that various other sensors can be utilized to acquire measurement data. For example, the measurement system 30 can include a sensor for detecting a direction of movement of the elongate band 34, which can be used to determine whether the data acquired by the length acquisition devices 44A, 44B should be incremented or decremented. Similarly, the measurement system 30 can include a switch that provides power to the length acquisition devices 44A, 44B, e.g., in response to user input, in order to acquire the measurement data. The measurement system 30 can stop providing power to the length acquisition devices 44A, 44B in response to user input and/or after a period of inactivity.

When the elongate band 34 includes markings 34A, a marking located below the acquisition device 44B when the band 34 is fully retracted can have a different appearance (e.g., shape, color, etc.) which can be used by the measurement system 30 to ensure that the elongate band 34 is fully retracted when the measurement data is starting to be acquired by the length acquisition devices 44A, 44B. Furthermore, it is understood that inclusion of the length acquisition devices 44A, 44B within the band housing 32 is only illustrative. For example, one or more length acquisition devices 44A, 44B can be located outside the housing, e.g., mounted on an underside of the platform 20, mounted on the opening structure 38A, 38B, mounted on the end support structure 26, etc.

Additionally, it is understood that the data acquisition approaches utilized by the length acquisition devices 44A, 44B are only illustrative of various data acquisition approaches that can be utilized in embodiments. For example, a data acquisition approach can be configured to determine a distance between the end of the platform 28B and the catches 36A, 36B using any of various transmit/receive measurement approaches. In this case, a transmitter, e.g., located at the opening structure 38B can transmit a signal, such as a laser, an electromagnetic wave, etc., which is directed at the catches 36A, 36B and induces a return signal, e.g., due to a reflection or a return transmission from a transmitter, such as a passive radio-frequency identification tag. A receiver, e.g., also located at the opening structure 38B, can receive the return signal and an amount of time between the transmission and return signals can be used to determine a distance using any known solution.

Figure 1A:
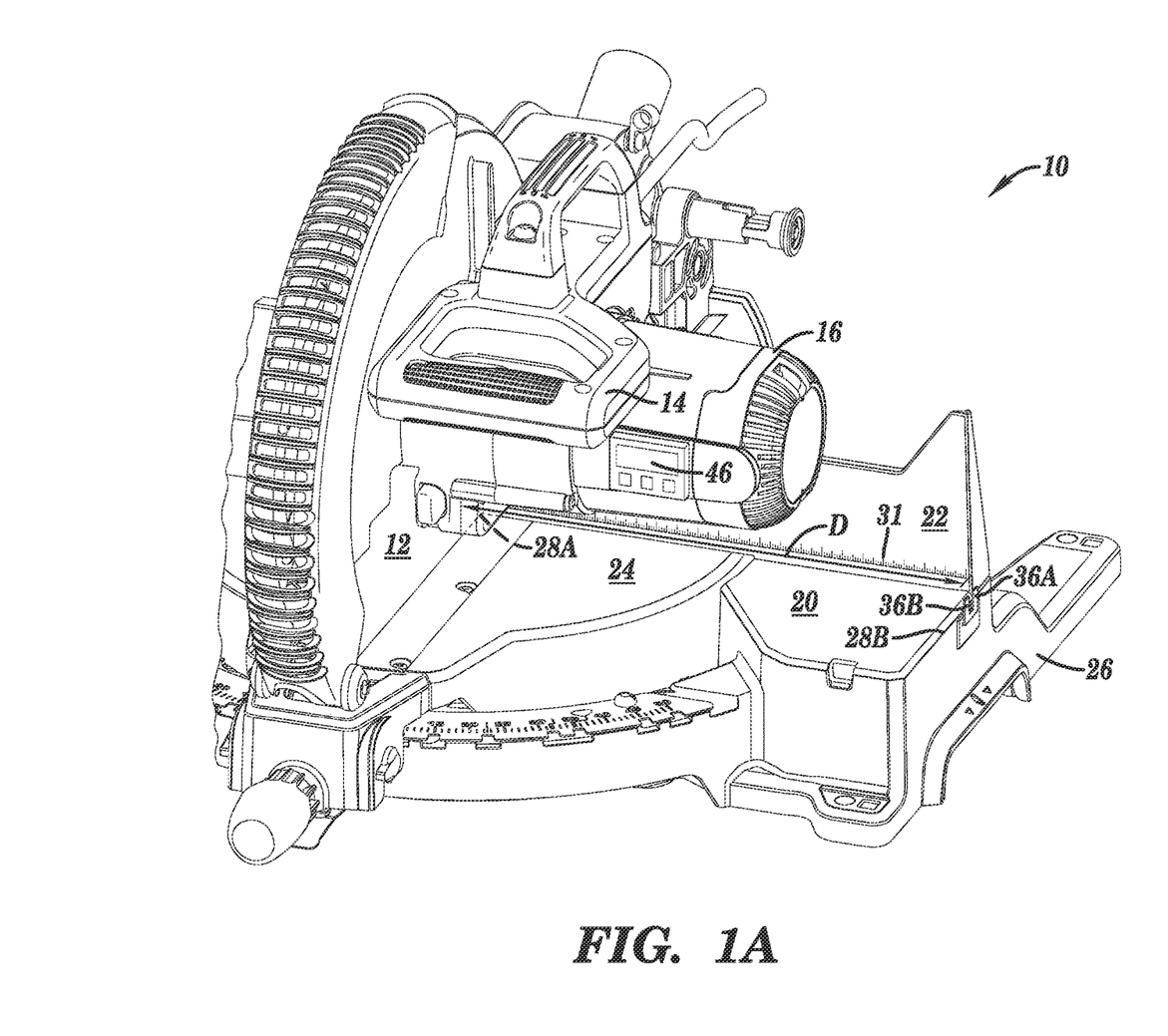
FIGS. 1A-1D show various views of an illustrative cutting device according to an embodiment.
Figure 1B:
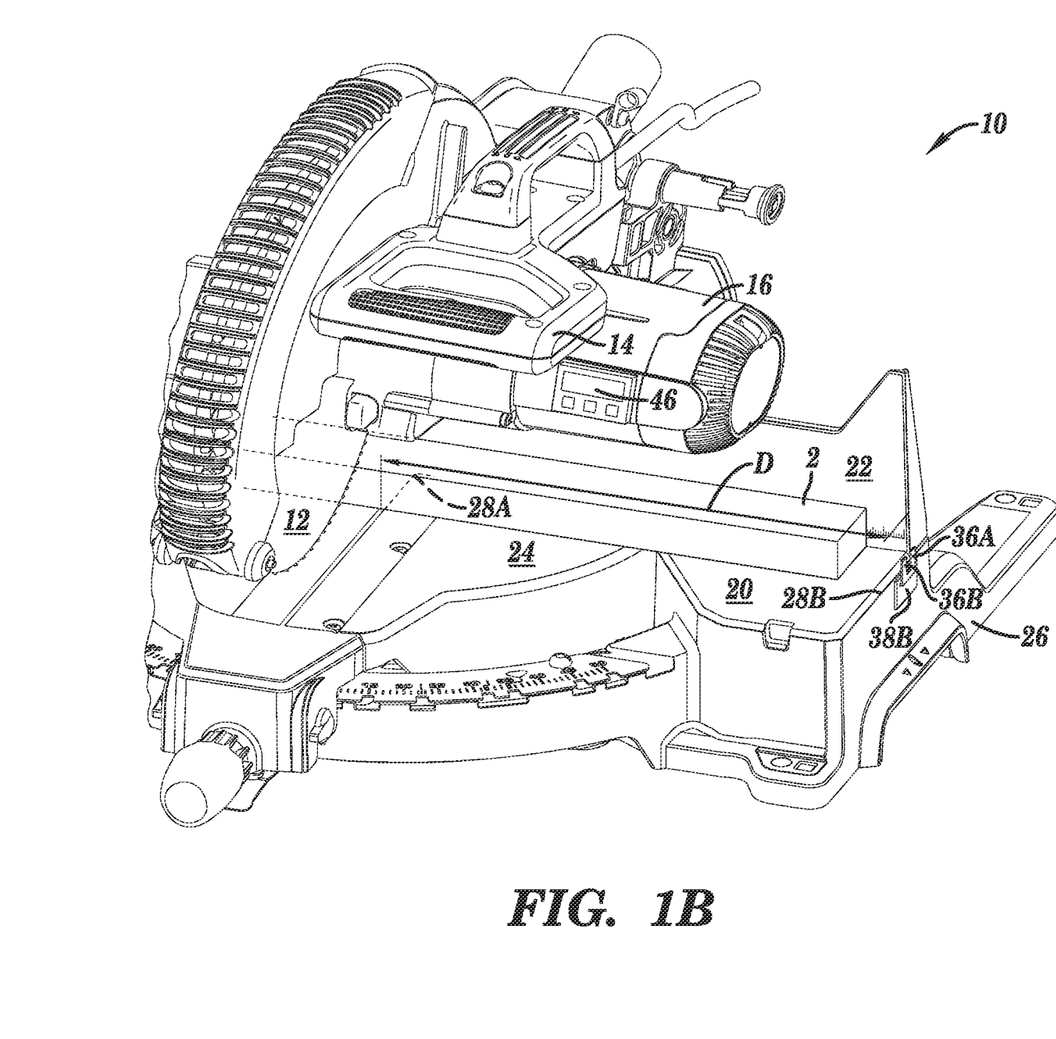
Figure 1C:
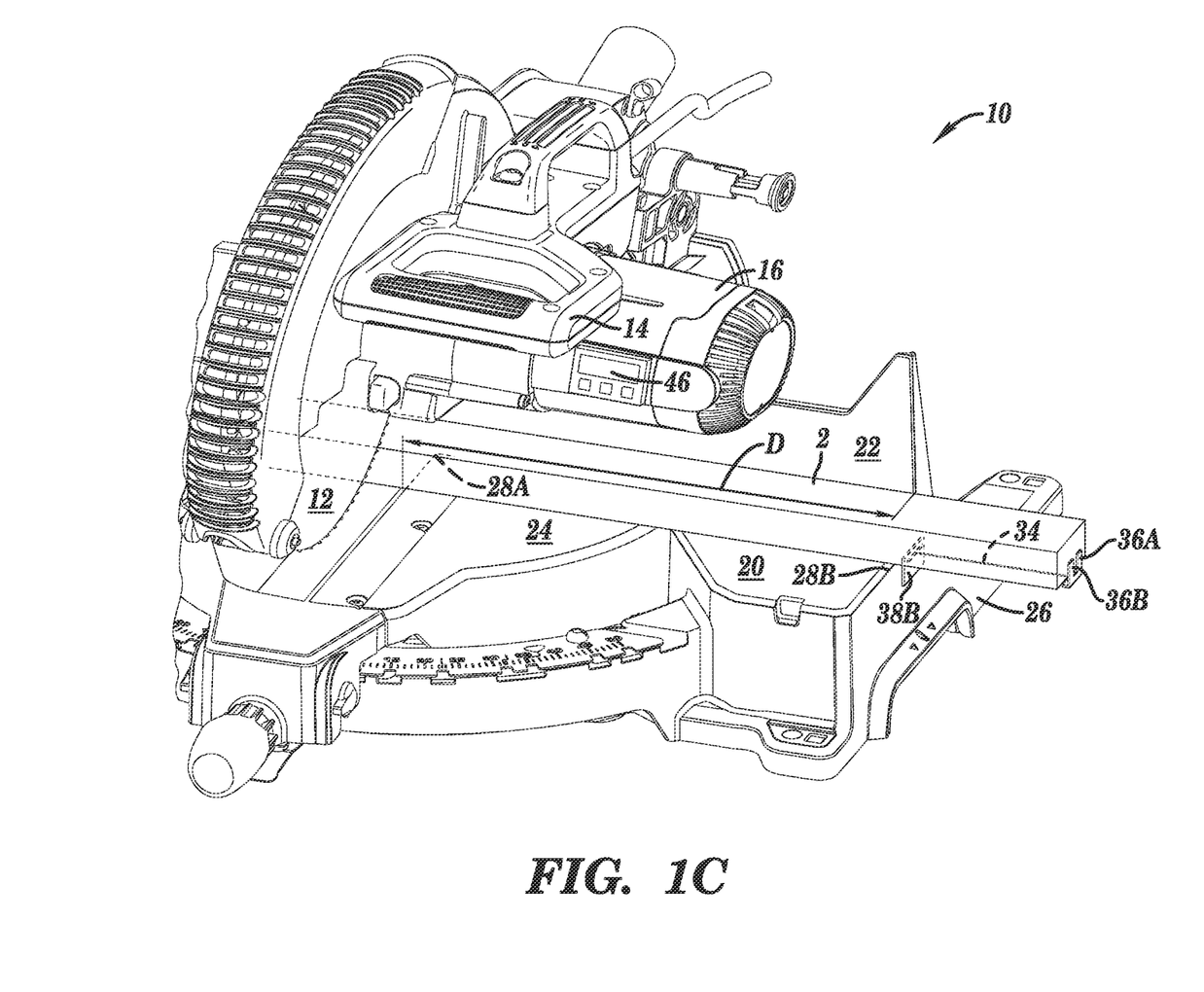
Figure 1D:
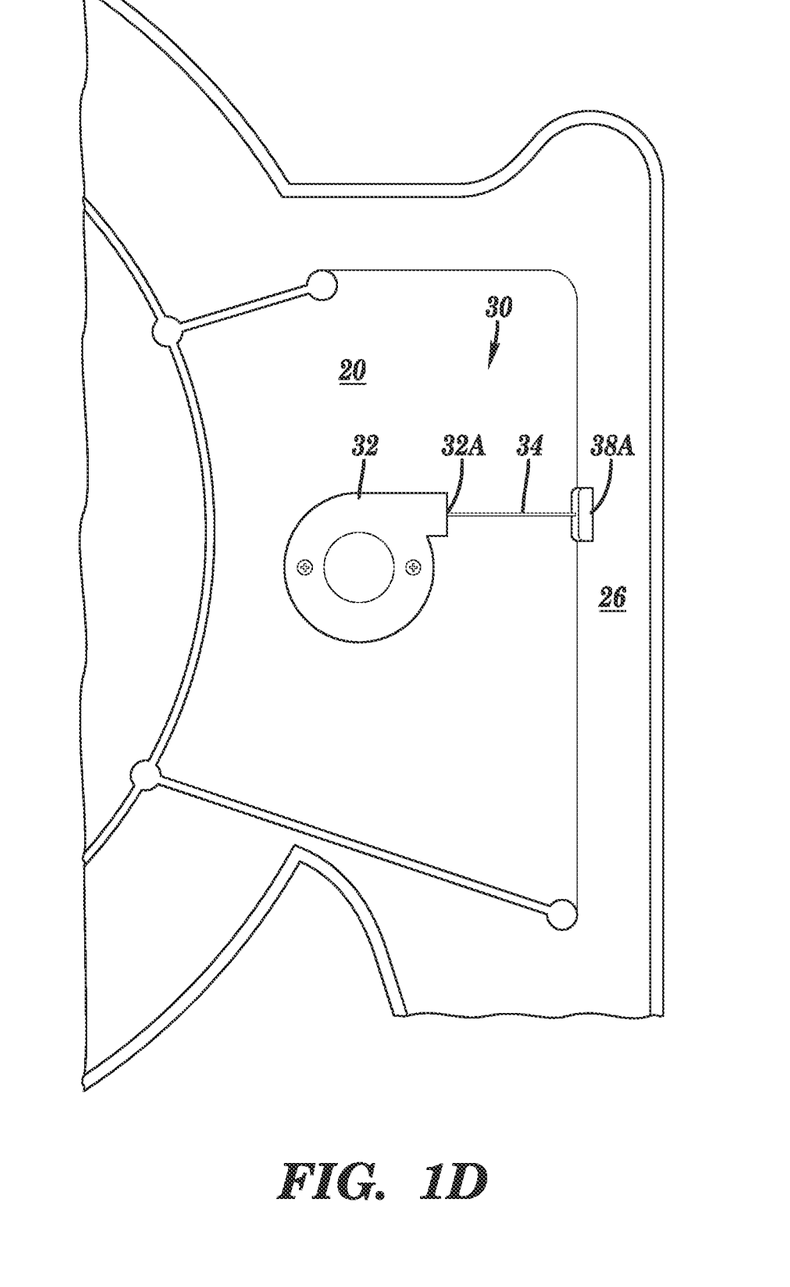

As shown in FIGS. 1A-1C, the measurement system 30 can include a measurement interface 46 which can enable a human operator of the cutting device 10 to interact with the measurement system 30. For example, the measurement interface 46 can enable the user to turn on or off the measurement system 30, receive measurements of a length of a material 2 from the measurement system 30, calibrate the measurement system 30, and/or the like. In an embodiment, the measurement interface 46 comprises a display device, such as a touchscreen display device, which can present information for display to the user and/or receive input from the user using a set of interface controls presented on the display device. However, it is understood that a touchscreen display device is only illustrative of various interfaces that can be implemented. For example, in other embodiments, the measurement interface 46 can include one or more buttons, dials, and/or other physical input devices, audio devices, such as a microphone, a set of speakers, etc., which can enable the user to provide input and receive output from the measurement system 30.

In an embodiment, the measurement interface 46 can be integrated into the motor housing 16 or permanently or removably mounted thereto using any solution. For example, the measurement interface 46 can be mounted to the motor housing 16 using an adhesive, hook and loop fasteners attached to the motor housing 16 and the measurement interface 46, fasteners, a snap fit, and/or the like. In an embodiment, the measurement interface 46 can acquire power from a power source available in the motor housing 16. Alternatively, the measurement interface 46 can include its own power source, such as a battery, and/or receive power from another power source implemented for the measurement system 30.

In an embodiment, the measurement interface 46 is configured to not display a measurement when the elongate band 34 is determined to be retracted such that the catches 36A, 36B are adjacent to the end support structure 26. In this case, power consumed by the measurement interface 46 can be conserved and the measurement interface 46 will not provide an inaccurate measurement that can confuse or mislead the user.

Figure 3:
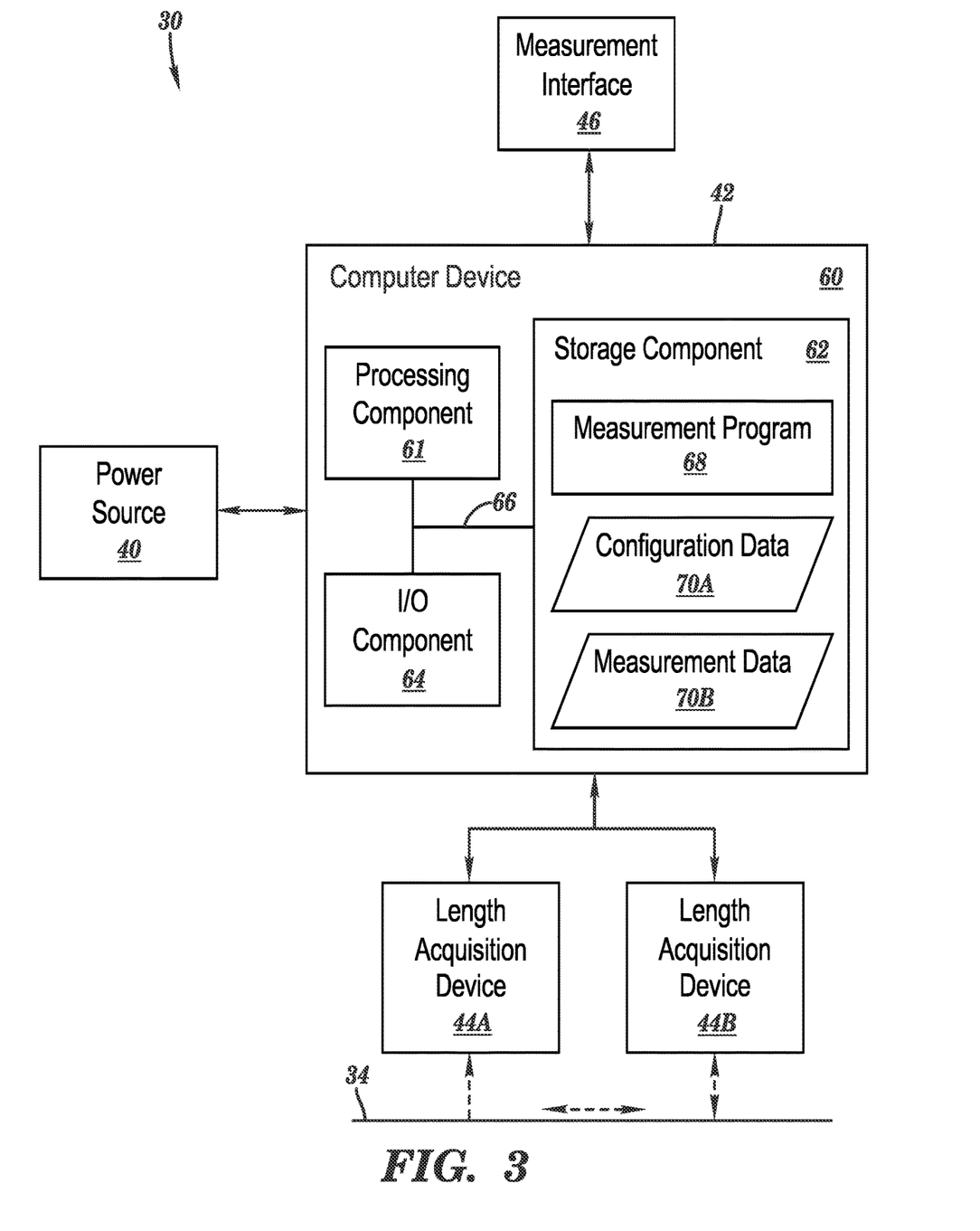
FIG. 3 shows a schematic view of an illustrative measurement system according to an embodiment.

FIG. 3 shows a schematic view of an illustrative measurement system 30 according to an embodiment. As described herein, the measurement system 30 includes one or more length acquisition devices 44A, 44B, each of which can include a sensor configured to operate alone or in conjunction with one or more emitters to acquire data corresponding to movement of the elongate band 34 and/or the set of catches 36A, 36B attached thereto.

Each length acquisition device 44A, 44B can provide the acquired data for use by a computing unit 42 that can perform a process described herein in order to determine a measurement for a length of the material 2 to be cut using the corresponding cutting device 10. In particular, the computing unit 42 can store and process the data received from the length acquisition devices 44A, 44B using configuration data 70A in order to calculate measurement data 70B, which the computing unit 42 can provide for presentation to a user via measurement interface 46.

The computing unit 42 can be any type of computer device 60 capable of receiving, processing, and outputting data as described herein. As illustrated, an illustrative embodiment of the computer device 60 can include a processing component 61 (e.g., one or more processors), a storage component 62 (e.g., a storage hierarchy including memory), an input/output (I/O) component 64 (e.g., one or more I/O interfaces and/or devices), and a communications pathway 66. In this case, the processing component 61 executes program code, such as a measurement program 68, which is at least partially fixed in the storage component 62. While executing program code, the processing component 61 can process data, which can result in reading and/or writing transformed data (e.g., measurement data 70B) from/to the storage component 62 and/or the I/O component 64 for further processing. The pathway 66 provides a communications link between each of the components in the computer device 60.

The I/O component 64 can provide interface(s) between the computing unit 42 and each length acquisition device 44A, 44B and the measurement interface 46. Each such interface can be implemented using a wired, an optical fiber, or wireless link, and can utilize any type of transmission technique and protocol.

The computing unit 42 can receive power from any type of power source 40. In an embodiment, the computing unit 42 receives power from a power source providing power to the cutting device 10, e.g., an electric cord plugged into an electric socket connected to the electric grid, a generator, and/or the like. Alternatively, the computing unit 42 can receive power independent of the cutting device 10, such as via one or more batteries. In any event, the computing unit 42 can provide power to one or more of the length acquisition devices 44A, 44B and/or the measurement interface 46. Alternatively, a length acquisition device 44A, 44B and/or the measurement interface 46 can include its own power source (e.g., a battery) or receive its power from the cutting device 10 separate from the computing unit 42.

The computing unit 42 can be located anywhere in conjunction with the cutting device 10. For example, the computing unit 42 can be included within the band housing 32, mounted adjacent to the band housing 32, integrated with the measurement interface 46, mounted adjacent to the measurement interface 46, and/or mounted anywhere on the cutting device 10 such that the computing unit 42 does not interfere with operating the cutting device 10.

As illustrated in FIGS. 1A-1D, the measurement system 30, particularly the band housing 32 of the measurement system 30, can be integrated into the cutting device 10. In an embodiment, the measurement system 30 can comprise a separate measurement housing, which is configured to be mounted to an external surface of the cutting device and includes at least the band housing 32. In this manner, the measurement system 30 can be added to a cutting device 10 manufactured without an integrated measurement system 30.

Figure 4:
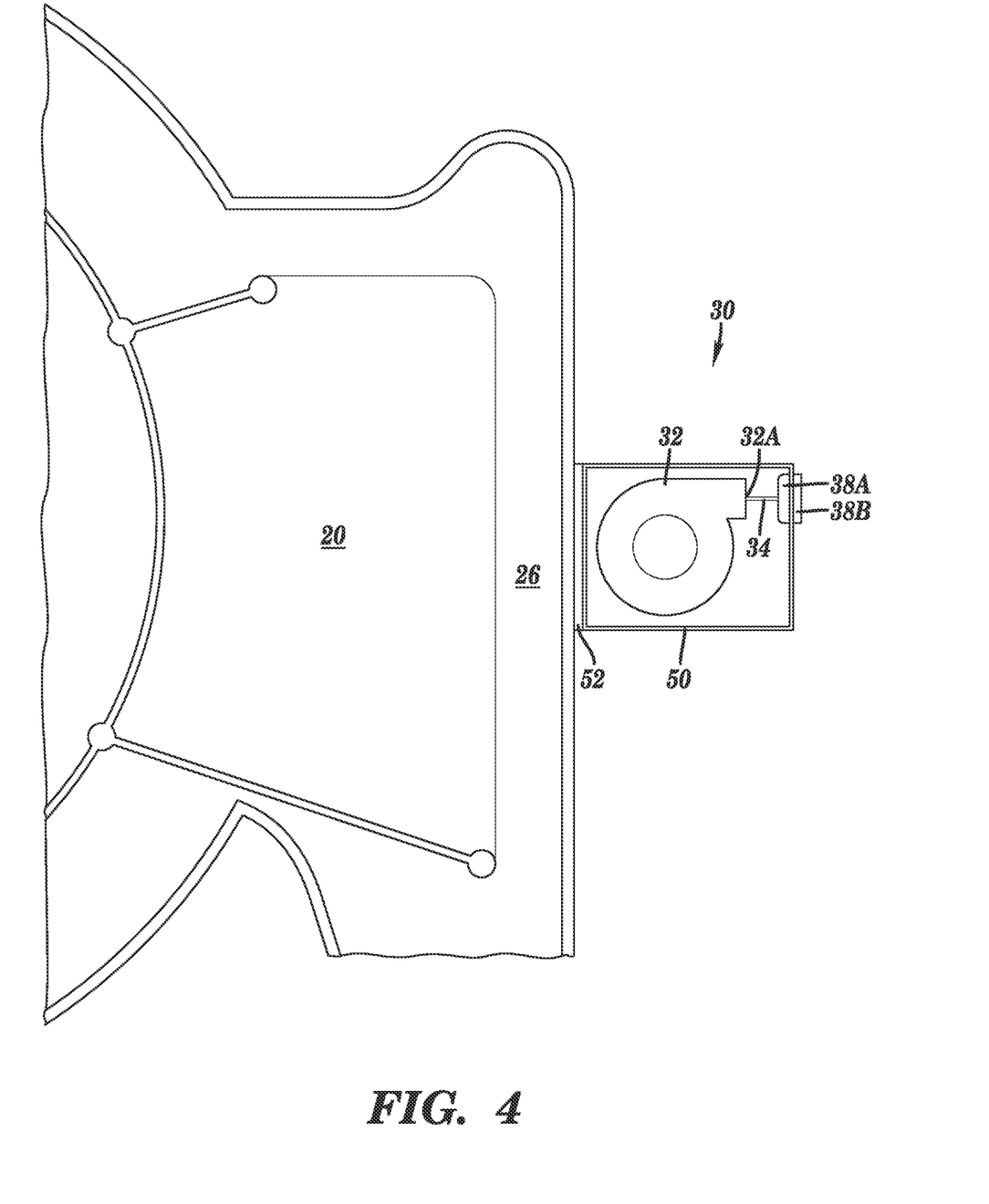
FIG. 4 shows an illustrative bottom view of a fixed platform with a measurement housing mounted thereto according to an embodiment.

For example, FIG. 4 shows an illustrative bottom view of a fixed platform 20 with a measurement housing 50 mounted thereto according to an embodiment. In this case, the measurement housing 50 can include an attachment mechanism 52 that enables the measurement housing 50 to be mounted to the outside surface of the end support structure 26. To this extent, the measurement housing 50 can have a corresponding side with the attachment mechanism 52 having a shape that is complementary to a shape of the outside surface of the end support structure 26.

The attachment mechanism 52 can comprise any type of temporary or permanent attachment mechanism. For example, the attachment mechanism 52 can include one or more magnets, one or more screws, bolts, strips of hook and loop fasteners, adhesive, tie(s), and/or the like, which can enable the measurement housing 50 to be mounted in a suitable location for acquiring measurement data based on movement of the elongate band 34.

While the elongate band 34 has been primarily shown and described as being located below the platform 20, it is understood that embodiments of the measurement system described herein can include the elongate band 34 mounted to the backstop 22. For example, the band housing 32 can be mounted to a back side of the backstop 22, and the catches 36A, 36B of the elongate band 34 can be configured to protrude from an end of the backstop 22 in a location just above the surface of the platform 20. Such a configuration can be implemented using essentially the same approach as shown and described in conjunction with FIGS. 1A-1D.

Figure 5:
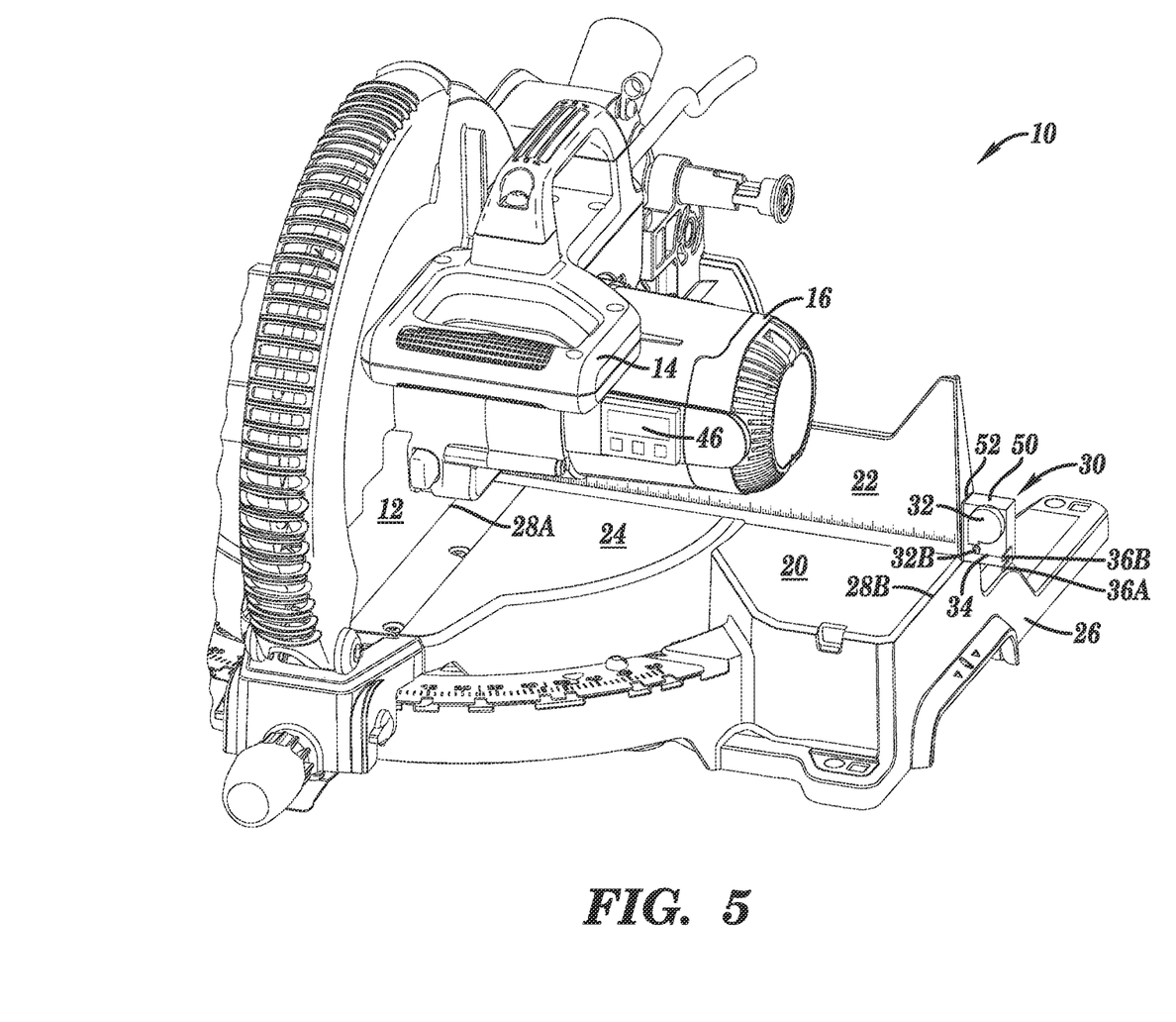
FIG. 5 shows a front view of an illustrative cutting device with a measurement housing mounted to a backstop according to an embodiment.

FIG. 5 shows a front view of an illustrative cutting device 10 with a measurement housing 50 mounted to a backstop 22 according to an embodiment. In this case, the measurement housing 50 can include an attachment mechanism 52 that enables the measurement housing 50 to be mounted to the outside surface of the backstop 22. To this extent, the measurement housing 50 can have a corresponding side with the attachment mechanism 52 having a shape that is complementary to a shape of the outside surface of the backstop 22.

The attachment mechanism 52 can comprise any type of temporary or permanent attachment mechanism. For example, the attachment mechanism 52 can include one or more magnets, one or more screws, bolts, strips of hook and loop fasteners, adhesive, tie(s), and/or the like, which can enable the measurement housing 50 to be mounted in a suitable location for acquiring measurement data based on movement of the elongate band 34. As illustrated, the measurement housing 50 also can include one or more components for properly routing the elongate band 34. In particular, the measurement housing 50 is shown including a routing structure 32B, which redirects the elongate band 34 from a downward orientation to a lateral orientation.

While the elongate band 34 is shown extending from the outer side of each of the measurement housings 50 shown in FIGS. 4 and 5, it is understood that embodiments of the measurement housings 50 can be configured to have the elongate band 34 extend from an opening located on an interior side of the measurement housing 50, on a top side of the measurement housing 50, etc. Furthermore, it is understood that each measurement housing 50 can enable selective positioning and/or use of the elongate band 34, e.g., by relocating the elongate band 34 as described herein. To this extent, embodiments of the measurement housings 50 shown in FIGS. 4 and 5 can be configured to be mounted to the cutting device 10 such that the side of the measurement housing 50 having a larger area is mounted to an adjacent to the cutting device 10.

In each of the embodiments shown and/or described herein, the computing unit 42 can determine a minimum distance between the catches 36A, 36B and the corresponding side surface of the cutting instrument 12 when the elongate band 34 is fully retracted using any solution. For example, a user can manually measure the distance as part of a calibration process when installing the measurement system 30 on a corresponding cutting device 10 and enter the distance using the measurement interface 46. Alternatively, the distance can be determined when manufacturing the cutting device 10 with the measurement system 30 integrated therein. Still further, the distance can be provided from a public database, e.g., based on the make and model of the cutting instrument 12 and the size and features of the corresponding measurement system 30. Regardless, the distance can be stored as configuration data 70A and used in calculating the measurement data 70B based on movement of the elongate band 34 as described herein. In an embodiment, the user can manually reset a current measurement provided by the measurement system 30 to the stored minimum distance using the measurement interface 46. Such a manual reset may be required, for example, due to an error in detecting movement by the length acquisition devices 44A, 44B.

In embodiments, a user can selectively use the measurement system 30 when operating the cutting device 10. For example, the user can select to turn on the measurement system 30 using the measurement interface 46. During use of the measurement system 30, the user can ensure that the catches 36A, 36B grip an end of the material 2 while moving the material into position to be cut by the cutting instrument 12. As the material 2 is moved, the elongate band 34 will extend from and/or return to the band housing 32. Data regarding the movement can be acquired by the length acquisition devices 44A, 44B.

The measurement interface 46 can provide a reading of the length of the material 2 as described herein. For example, the computing unit 42 can receive data from the length acquisition devices 44A, 44B corresponding to a length of the elongate band 34 has been extended from its minimum extension. The computing unit 42 can add the minimum distance to the length and provide the combined distances as the measured length of the material 2, e.g., the measured length of the material 2 can be displayed on the measurement interface 46. Once the measured length corresponds to the desired length, the user can operate the cutting device 10 to cut the material 2. After the material 2 is cut, it can be removed, causing the catches 36A, 36B to no longer be held by the end of the material 2, thereby allowing the elongate band 34 to return to the band housing 32.

In an embodiment, the user can use the measurement interface 46 to input a target length of the material 2 to be cut. In this case, the computing unit 42 can generate a notification for the user when the measured length corresponds to the target length, which can be output by the measurement interface 46. Any type of notification can be used. For example, the measurement interface 46 can change a display color of the measured length (e.g., from red to green) in response to the measured length matching the target length. Additionally or alternatively, the measurement interface 46 can emit a sound, such as a tone, in response to the measured length matching or not matching the target length. Still further, the computing unit 42 can generate different outputs based on whether the measured length is lower or higher than the target length, based on a distance from the target length, etc., each of which can be output by the measurement interface 46.

While the drawings illustrate a measurement system implemented to the right of a user that would be using the cutting device 10, it is understood that aspects of the measurement system described herein can be implemented to the left of the user. To this extent, embodiments of the measurement system described herein can enable measurements to be acquired to the right of a designated location, such as a cutting location, to the left of the designated location, or both. Similarly, embodiments of a measurement system described herein can enable measurement in any direction with respect to the designated location, including forward or rearward, at a predetermined angle, etc.

While shown and described in conjunction with human operated cutting devices, it is understood that a measurement device and/or system described herein can be utilized in conjunction with various applications. For example, a measurement device and/or system can be utilized in conjunction with and/or integrated into a platform used to position materials that may require measuring for any purpose. Furthermore, a measurement device and/or system described herein can be utilized in conjunction with and/or incorporated into any semi-automated or automated material processing apparatus for which material measurements may be desired. When a measuring system is incorporated into a device described herein, the elongate band can include human readable markings that correspond to the distance from a predetermined location of the device.

It is understood that, unless otherwise specified, each value is approximate and each range of values included herein is inclusive of the end values defining the range. Terms of degree such as "generally," "substantially," "about," and "approximately" as used herein mean a reasonable amount of deviation of the modified term such that the end result is not significantly changed. For example, these terms can be construed as including a deviation of at least +/−0.5% of the modified term if this deviation would not negate the meaning of the word it modifies. In a more particular example, the term "approximately" is inclusive of values within +/−ten percent of the stated value, while the term "substantially" is inclusive of values within +/−five percent of the stated value when these deviations would not negate the meaning of the word each term modifies. Unless otherwise stated, two values are "similar" when the amount of deviation between the two values does not significantly change the result.

As used herein, unless otherwise noted, the term "set" means one or more (i.e., at least one) and the phrase "any solution" means any now known or later developed solution. The singular forms "a," "an," and "the" include the plural forms as well, unless the context clearly indicates otherwise. Additionally, the terms "comprises," "includes," "has," and related forms of each, when used in this specification, specify the presence of stated features, but do not preclude the presence or addition of one or more other features and/or groups thereof.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A human-operated cutting device comprising:
   a platform for supporting a material to be cut;
   a cutting instrument for cutting the material at a cutting location along the platform;
   a band housing for containing an elongate band under tension, the band housing including an opening through which the elongate band can be extended and retracted;
   a catch attached to an end of the elongate band, wherein the catch is configured to grab onto an end of the material as it is extended beyond a side of the platform;
   at least one length acquisition device for acquiring length data corresponding to a length of the elongate band that has been extended from a minimum extension;
   a computing unit for calculating a length of the material to be cut using the length data; and
   a measurement interface for providing a user with information corresponding to the calculated length of the material.

2. The device of claim 1, wherein the band housing is located at a height located below the platform.

3. The device of claim 1, wherein the band housing is mounted to an underside of the platform.

4. The device of claim 1, further comprising a backstop against which the material can be placed.

5. The device of claim 4, wherein the band housing is mounted to the backstop.

6. The device of claim 4, wherein the backstop includes measurement markings for measuring a length of the material that is less than a distance between the cutting location and the side of the platform.

7. The device of claim 1, wherein the elongate band includes a plurality of measurement markings.

8. The device of claim 7, wherein the at least one length acquisition device includes a video camera for acquiring image data during movement of the elongate band.

9. The device of claim 1, further comprising a mechanism for selectively locating the catch in one of a plurality of locations.

10. The device of claim 9, wherein at least one of the plurality of locations is a storage location in which the catch will not grab onto the end of the material.

11. The device of claim 1, wherein the cutting device is an electrically powered cutting device.

12. The device of claim 1, wherein the cutting device is a miter saw.

13. A device comprising:
    a platform for supporting a material;
    a backstop for locating the material on the platform, wherein the platform and the backstop define a cutting location for the material; and
    a band housing mounted to at least one of: the platform or the backstop, wherein the band housing includes:
       an elongate band spooled under tension; and
       an opening through which the elongate band can extend and retract;
    a catch attached to an end of the elongate band, wherein the catch is configured to grab onto an end of the material as it is extended beyond a side of the at least one of: the platform or the backstop;
    at least one length acquisition device for acquiring length data corresponding to a length of the elongate band that has been extended from a minimum extension;
    a computing unit for calculating a length of the material to be cut using the length data; and
    a measurement interface for providing a user with information corresponding to the calculated length of the material.

14. The device of claim 13, further comprising a cutting instrument for cutting the material at the cutting location.

15. The device of claim 13, wherein the band housing is mounted to at least one of: an underside of the platform or a backside of the backstop.

16. The device of claim 13, wherein the band housing is mounted to the side of the at least one of: the platform or the backstop.

17. The device of claim 13, further comprising a mechanism for selectively locating the catch in one of a plurality of locations.

18. The device of claim 13, wherein the measurement interface is further configured to enable a user to input a target length of the material to be cut, and wherein the computing unit generates a notification based on a comparison between the target length of the material and the calculated length of material.

19. A measurement device comprising:
    a structure configured for mounting to at least one of: a platform or a backstop, of a cutting device, wherein the structure includes a housing including an elongate band spooled under tension and an opening through which the elongate band can be extended;
    a catch attached to an end of the elongate band, wherein the catch is configured to grab onto an end of material as it is extended beyond a side of at least one of: the platform, the backstop, or the structure;
    at least one length acquisition device for acquiring length data corresponding to a length of the elongate band that has been extended from a minimum extension;
    a computing unit for calculating a length of the material using the length data; and
    a measurement interface for providing a user with information corresponding to the calculated length of the material.

20. The device of claim 19, wherein the length of the material corresponds to a distance between the end of the material and a cutting location defined by the platform and the backstop.

* * * * *